Nov. 13, 1951 — A. M. BROWN — 2,575,204
DEVICE FOR RETRACTING FACE SKIN
Filed Dec. 11, 1948
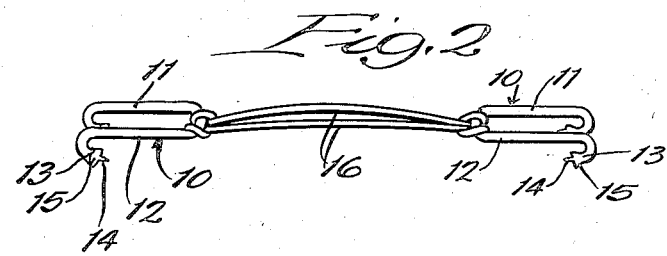
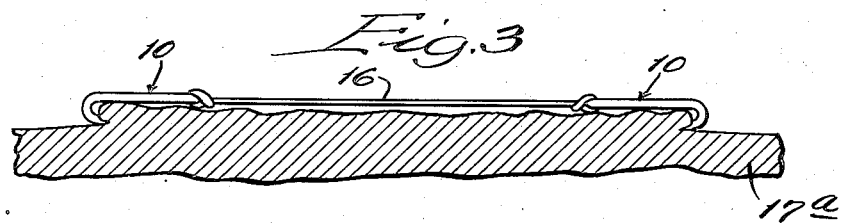
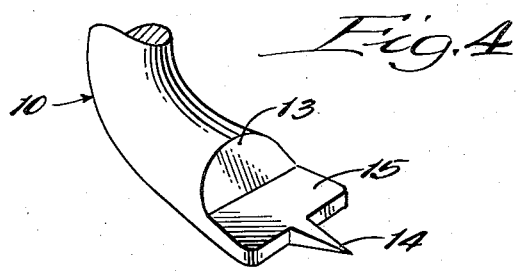
Inventor:
Adolph M. Brown,
By Dawson, Ons, Pothany Spangenberg,
Attorneys.

Patented Nov. 13, 1951

2,575,204

UNITED STATES PATENT OFFICE 2,575,204

DEVICE FOR RETRACTING FACE SKIN

Adolph M. Brown, Chicago, Ill.

Application December 11, 1948, Serial No. 64,817

4 Claims. (Cl. 128—76)

This invention relates to a device for tensioning the skin over various parts of the human anatomy, and especially the face. It relates particularly to a device for retracting the loose skin from the human face to minimize facial senescence.

Facial senescence is evidenced by the appearance of excess skin on the human face which hangs loosely therefrom in the form of bags or folds or begins to show wrinkles. More specifically, the lower third of the face has less vertical dimension because the teeth become worn and there is a slight absorption of the mandible, while the skin covering these parts does not lessen in area, but may even increase in surface area during advancing years. The effects of age on the upper portion of the face are evidenced by crow's-feet wrinkles at the outer canthus and a lowering or relaxation of the eye-brow position.

Many techniques have been devised to eradicate the evidences of age. Temporary relief is secured by a "facial," a massage which causes swelling of the subcuticular tissue. The ordinary result of a "facial" is a slight tenseness of the face skin with perhaps some lessening of the facial crepiness, but this effect is had for only a few hours. Others apply "make-up" to conceal the wrinkles by whitening the shadows to substitute a high-light. Still others resort to a surgical "face-lift" which consists in actually excising the excess skin in an area where the incision will be concealed. A "face-lift" very often successfully eradicates some of the evidences of age by tensioning the skin over the face in a pre-determined pattern, but it is relatively expensive, fraught with dangers incident to surgical operations, and it is effective only for months or several years, depending on the elasticity of the skin and the extent of the operation.

It is an object of this invention to provide means for securing the effects of a "face-lift" without surgery.

Another object is to provide a concealed device for retracting excess skin from the face to eradicate wrinkles and bags or folds.

A further object is to provide substantially concealed devices for drawing the face skin taut in predetermined areas and in pre-determined directions to eradicate facial senescence and to give various desired effects of facial appearance.

These and other objects and advantages of this invention will hereinafter appear, and for purposes of illustration but not of limitation, an embodiment is shown in the accompanying drawings in which—

Figure 1 is a fragmentary pictorial view of a human head showing devices embodying features of my invention in position of use;

Figure 2 is an enlarged perspective view of a device embodying features of this invention;

Figure 3 is a sectional view taken along the line 3—3 of Figure 1; and

Figure 4 is an enlarged fragmentary perspective view of the hook end of the illustrated device.

Briefly described, my invention consists of a device having a pair of anchoring members connected by an elastic body. The construction of the elements is such that they appear as a normal hair-pin, bobby pin, or the like when visible in position of use, but, more often, the construction is such that the entire unit may be concealed by the overlying hair. The anchoring members are provided with hook or gripping elements which engage the skin or substances associated therewith, and, when in position of use, the tensioned elastic body serves constantly to pull the skin taut over the face to eradicate wrinkles by retracting loose skin from certain areas.

As shown, the anchoring member is a U-shaped element 10 formed from a ribbon, wire, or the like of tempered steel, stainless steel, or other spring metal bent to desired shape. Alternatively, it may be molded of plastic material. The cross-sectional dimension and shape of the U-shaped member is selected to simulate a hair-pin, bobby pin, or other like unit used in conventional coiffures. For example, the spaced arms 11 and 12 may be flat, round, or of other geometrical shape in cross-section and straight, rippled, or wavy in length-wise contour. In order to permit concealment, the cross-sectional area of the elements forming the anchoring member should be dimensioned to be of the order of 0.050 inch or less in diameter.

The free ends 13 of each arm 11 and 12 are inturned to approach the scalp 17a at a reverse angle as the U-shaped member is arranged in parallel relation over the skin. A surgically sharp spur or spicule 14 is formed on the end of the inturned portion to extend from a flared section 15 which provides a stop or shoulder to limit the amount which the spur can be imbedded into the skin. To limit penetration substantially to the outer horny layer of the scalp skin, the spur is dimensioned to be less than that capable of piercing the entire skin layer. Since the skin at the top of the head may be thicker than tissue that is ordinarily found in other parts of the human, the spurs may be dimensioned to be of a length of about 0.015 to 0.025 inch unless a protective coat is first applied to the skin, and then greater lengths can be tolerated.

To function properly beyond the hairline, the spurs are arranged to be spaced from the body portion of the U-shaped piece to permit hairs to intervene without interfering with the gripping action. For this purpose, a spacing of one-eighth to three-eighth inch is sufficient.

The anchor members are arranged in pairs connected one to another at their bails by an elastic substance, preferably in the form of a rubber band 16. The elastic member, when in released position, is usually dimensioned to provide for a span of less than one inch between connected anchors. The elastic body and the anchor members may be tinted or selected of a color, such as brown, black, blond, or grey, to correspond to the color of the hair to provide for greater concealment when in position of use. As a modification, the bail portion of the anchor member might be formed with an eyelet more properly to position the connection band.

In application, one of the anchor members 10 is hooked into the skin at the hairline or just beyond the hairline 17, as shown in Figure 1 of the drawings. The partner anchor is moved toward the top of the head until the tension developed between the anchors is sufficient to retract enough skin from the face. Then the upper anchor is hooked into the scalp and the conditions previously existing remain substantially the same because the skin of the upper scalp is relatively immovable. Relative immovability of the skin in the upper scalp may be attributed, in part, to its operation as a fulcrum when devices of the same character are employed on the opposite side of the head. The ultimate reaction of the device is to pull the face skin up to a position that it occupied years before.

The desired effect may be secured by one retractor, but several may be used in side by side or spaced relation throughout the temple and lateral forehead hairline. They may also be selectively arranged to exert pull in angular relation with one another to give various combinations and effects in facial appearance. For best results, the direction of pull developed should be conjointly posteriorly and superiorly. By the use of a plurality of retractors, the stress can be distributed and the direction of pull can be varied to meet existing conditions.

Ordinarily, the anchor members are mounted while the hair is parted, and after positioning, the hair is combed into place and the retractors are thereby effectively concealed.

As previously pointed out, a protective coating may be applied to the skin to accept all or the greater portion of the spur. To this end, the skin may be prepared by the application of a fluid substance that rapidly dries to a relatively solid layer which is strongly adherent to the surface of the skin. Use may be made of various solutions of film-forming resinous materials, such as the vinyl polymers and copolymers, adherent polyacrylates, and cellulose ethers of the type nitro-cellulose and the like. When the resinous substances are insufficiently flexible, they may be flexibilized or softened with suitable amounts of plasticizer, the type and amount for each plastic being well known in the adhesives and plastics arts.

For one application, nitro-cellulose or collodion mixed with an additive of the type polyvinyl butyral and thinned with castor oil and isopropyl alcohol is deposited in a relatively thin layer on the skin at the point where it is anticipated that the anchors will be hooked. The solution dries to an adherent tough layer which can be pierced by the spur, and it minimizes the extent of the penetration of the spur into the skin. With the protective layer, the retractors can be worn for several hours without ill effects.

It will be manifest from the foregoing that I have produced a new and novel device for eradicating wrinkles and folds existing over the human face and the human body. An important concept of this invention resides in the combined characteristics of function in the desired manner and substantial concealment of the elements by which such function is secured. The device described should not be taken as a therapeutic treatment, its function being merely temporarily to retract the loose skin from the face, and it is not designed to be worn for extended periods of time. The method for minimizing facial senescence with devices of this type is described and claimed in my copending application Serial No. 64,818, filed on December 11, 1948, and entitled "Method for Minimizing Facial Senescence."

It will be understood that numerous changes may be made in the details of construction, arrangement, and operation without departing from the spirit of the invention, especially as defined in the following claims.

I claim as my invention:

1. A device for drawing the skin taut over the face comprising a pair of U-shaped wire-like members having their upper ends inturned to be in spaced relation with the U-shaped portion, spurs on each inturned end dimensioned to be of a length between 0.015 and 0.025 inch, and an elastic connection between the U-shaped members.

2. A device for drawing the skin taut over the face comprising a pair of U-shaped members having their upper ends inturned to be in spaced relation with the U-shaped portion, spurs on each inturned end, stops at the base of the spurs to limit penetration thereof to less than 0.025 inch, and an elastic connection between the U-shaped members.

3. A device, as claimed in claim 2, in which the stops comprise flattened areas formed on the inturned ends.

4. A device for use in retractors of face skin comprising a wire-like unit formed to U-shape with spaced inturned portions formed of the free ends thereof, an extremely sharp spur on the inturned ends dimensioned to be less than 0.025 inch, and a shoulder of greater dimension at the base of each spur.

ADOLPH M. BROWN.

REFERENCES CITED

The following references are of record in the file of this patent:

UNITED STATES PATENTS

| Number | Name | Date |
|---|---|---|
| 709,392 | Brown | Sept. 16, 1902 |
| 816,026 | Meier | Mar. 27, 1906 |
| 2,472,009 | Gardner | May 31, 1949 |

FOREIGN PATENTS

| Number | Country | Date |
|---|---|---|
| 5,163 | Great Britain | 1900 |
| 217,083 | Great Britain | June 12, 1924 |